(12) United States Patent
Shveidel et al.

(10) Patent No.: US 11,093,169 B1
(45) Date of Patent: Aug. 17, 2021

(54) LOCKLESS METADATA BINARY TREE ACCESS

(71) Applicant: EMC IP Holding Company LLC, Hopkinton, MA (US)

(72) Inventors: Vladimir Shveidel, Pardes-Hana (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/861,986

(22) Filed: Apr. 29, 2020

(51) Int. Cl.
*G06F 3/06* (2006.01)

(52) U.S. Cl.
CPC .......... *G06F 3/0655* (2013.01); *G06F 3/061* (2013.01); *G06F 3/0688* (2013.01)

(58) Field of Classification Search
CPC ...... G06F 3/0665; G06F 3/061; G06F 3/0688; G06F 2212/466
USPC ................................................. 711/154, 103
See application file for complete search history.

(56) References Cited

U.S. PATENT DOCUMENTS

| | | | |
|---|---|---|---|
| 8,954,383 B1 | 2/2015 | Vempati et al. | |
| 9,003,227 B1 | 4/2015 | Patel et al. | |
| 9,104,675 B1 | 8/2015 | Clark et al. | |
| 9,778,996 B1 | 10/2017 | Bono et al. | |
| 10,489,301 B1 * | 11/2019 | Visvanathan | G06F 3/067 |
| 2005/0083937 A1 * | 4/2005 | Lim | H04L 45/7453 370/392 |
| 2015/0324131 A1 * | 11/2015 | Loh | G06F 12/023 711/117 |

OTHER PUBLICATIONS

U.S. Appl. No. 16/260,660, filed Jan. 29, 2019, and entitled "System and Method for Aggregating Metadata Changes in a Storage System."

* cited by examiner

*Primary Examiner* — Hashem Farrokh
(74) *Attorney, Agent, or Firm* — Ryan, Mason & Lewis, LLP

(57) ABSTRACT

A processing device is configured to obtain an input-output operation that corresponds to a first metadata page and to identify a corresponding binary tree. The binary tree comprises a plurality of nodes each comprising a delta corresponding to a metadata page. The processing device is further configured to perform a read traversal process corresponding to the first metadata page which comprises traversing the binary tree based at least in part on the first metadata page while the binary tree is locked by a node insertion process corresponding to a second metadata page. The node insertion process comprises inserting a first node corresponding to the second metadata page into the binary tree. The read traversal process further comprises locating a second node of the binary tree that corresponds to the first metadata page and obtaining a first delta that corresponds to the first metadata page from the second node.

20 Claims, 13 Drawing Sheets

LOCKLESS METADATA BINARY TREE ACCESS

FIELD

The field relates generally to information processing systems, and more particularly to the storage of data in information processing systems.

BACKGROUND

In some cases, an information processing system comprises a storage system that stores changes to metadata pages in-memory before destaging to changes to the storage devices of the storage array. During read operations, the changes are obtained and merged into the corresponding metadata pages to generate current versions of the metadata pages. During write operations, new changes to the metadata pages are stored in-memory to await destaging. In some cases, accessing the in-memory changes to the metadata pages for both read and write operations may cause contention issues which may result in increased latency in the storage array.

SUMMARY

Illustrative embodiments provide techniques for upgrading nodes in a storage system. For example, in one embodiment, an apparatus comprises at least one processing device comprising a processor coupled to a memory. The at least one processing device is configured to obtain an input-output operation that corresponds to a first metadata page and to identify a binary tree that corresponds to the first metadata page. The binary tree comprises a plurality of nodes each comprising a delta corresponding to a metadata page. The at least one processing device is further configured to perform a read traversal process corresponding to the first metadata page. The read traversal process comprises traversing the binary tree based at least in part on the first metadata page while the binary tree is locked by a node insertion process corresponding to a second metadata page. The node insertion process comprises inserting a first node corresponding to the second metadata page into the binary tree. The read traversal process further comprises locating a second node of the binary tree that corresponds to the first metadata page and obtaining a first delta that corresponds to the first metadata page from the second node.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
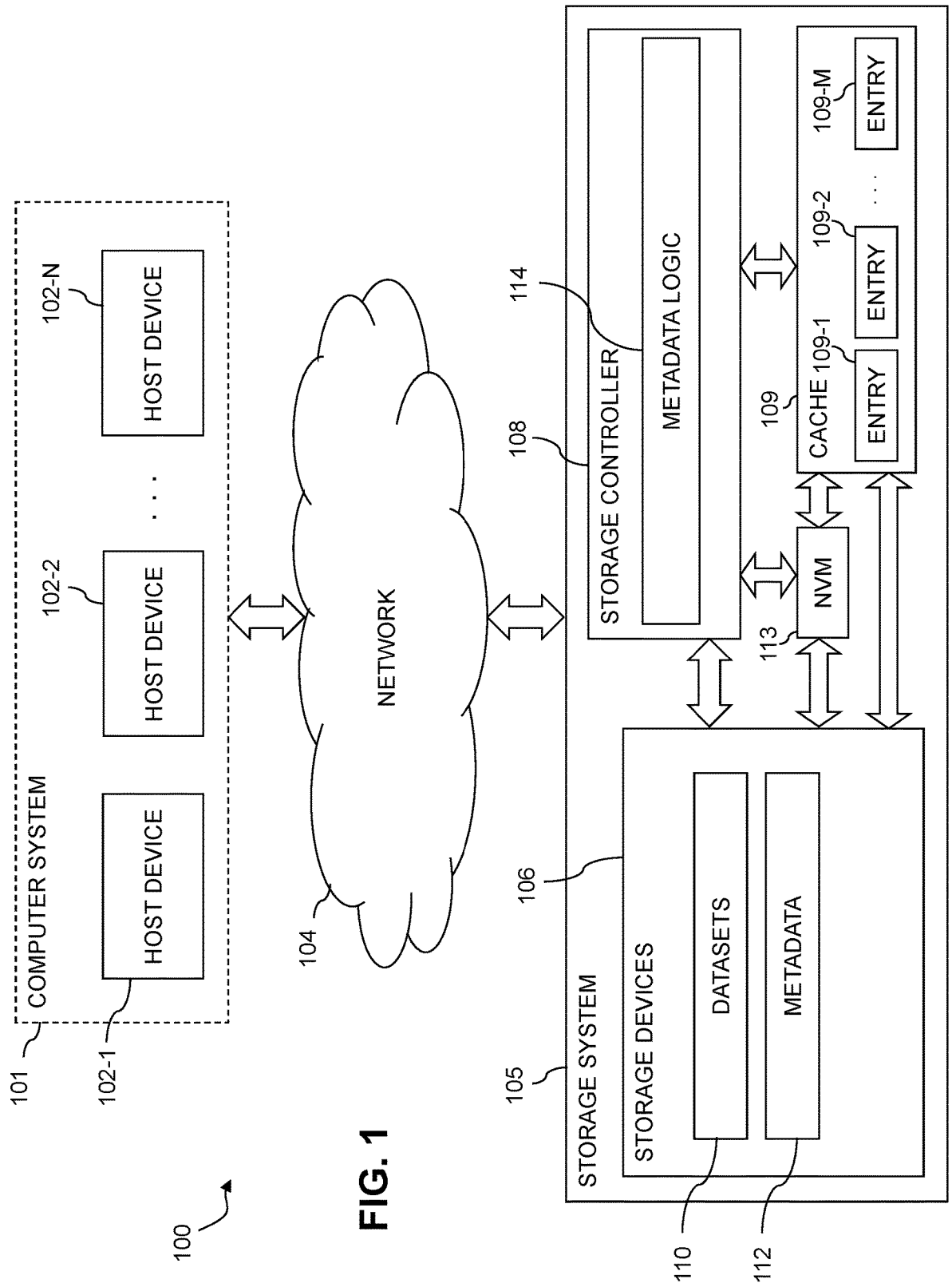
FIG. 1 is a block diagram of an information processing system comprising a storage system configured with lockless metadata binary tree access functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106, an associated storage controller 108, an associated cache 109 and associated non-volatile memory (NVM) devices 113. In some embodiments, the associated NVM devices 113 may comprise one or more of the storage devices 106. In some embodiments, one or more of the associated NVM devices 113 may be different devices than the plurality of storage devices 106.

The storage devices 106 store datasets 110 and metadata 112. Datasets 110 may comprise logical storage volumes, snapshots or other arrangements of data. Metadata 112 may comprise data about the datasets 110 that may be used by IO threads servicing IO requests to access the datasets 110. For example, metadata 112 may include mappings or other data that may be used to determine how and where the logical storage volumes, snapshots, or other arrangements of data are stored in storage devices 106, relationships between the logical storage volumes, snapshots, or other arrangements of data or any other information associated with the datasets 110. In some embodiments, metadata 112 may be stored in storage devices 106 in physical groups or "buckets" where each bucket of metadata 112 may comprise a bucket map page and one or more metadata pages that each characterize a set of n data pages stored in datasets 110. The bucket map page defines the layout of the bucket of metadata including, for example, which metadata pages exist in the bucket.

The storage devices 106 and NVM devices 113 illustratively comprise solid state drives (SSDs). Such SSDs are implemented using NVM devices such as flash memory. Other types of NVM devices that can be used to implement at least a portion of the storage devices 106 or NVM devices 113 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC. Other types of storage arrays, including by way of example VNX®, Symmetrix VMAX®, PowerMAX® and PowerStore® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes metadata logic 114. The metadata logic 114 is configured to control the updating and storage of metadata 112, for example, using the processes illustrated in the flow diagrams of FIGS. 10 and 11. The storage controller 108 and storage system 105 should also be understood to include additional modules and other components typically found in conventional implementations of storage controllers and storage systems, although such additional modules and other components are omitted from the figure for clarity and simplicity of illustration.

The cache 109 of storage system 105 in the FIG. 1 embodiment includes cache entries 109-1, 109-2, . . . , 109-M which temporarily store data that is being processed by storage system 105, for example, data associated with write and read IO requests, metadata, or other similar data. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108.

The storage system 105 should also be understood to include additional modules and other components typically found in conventional implementations of storage systems, although such additional modules and other components are omitted from the figure for clarity and simplicity of illustration.

Figure 2:
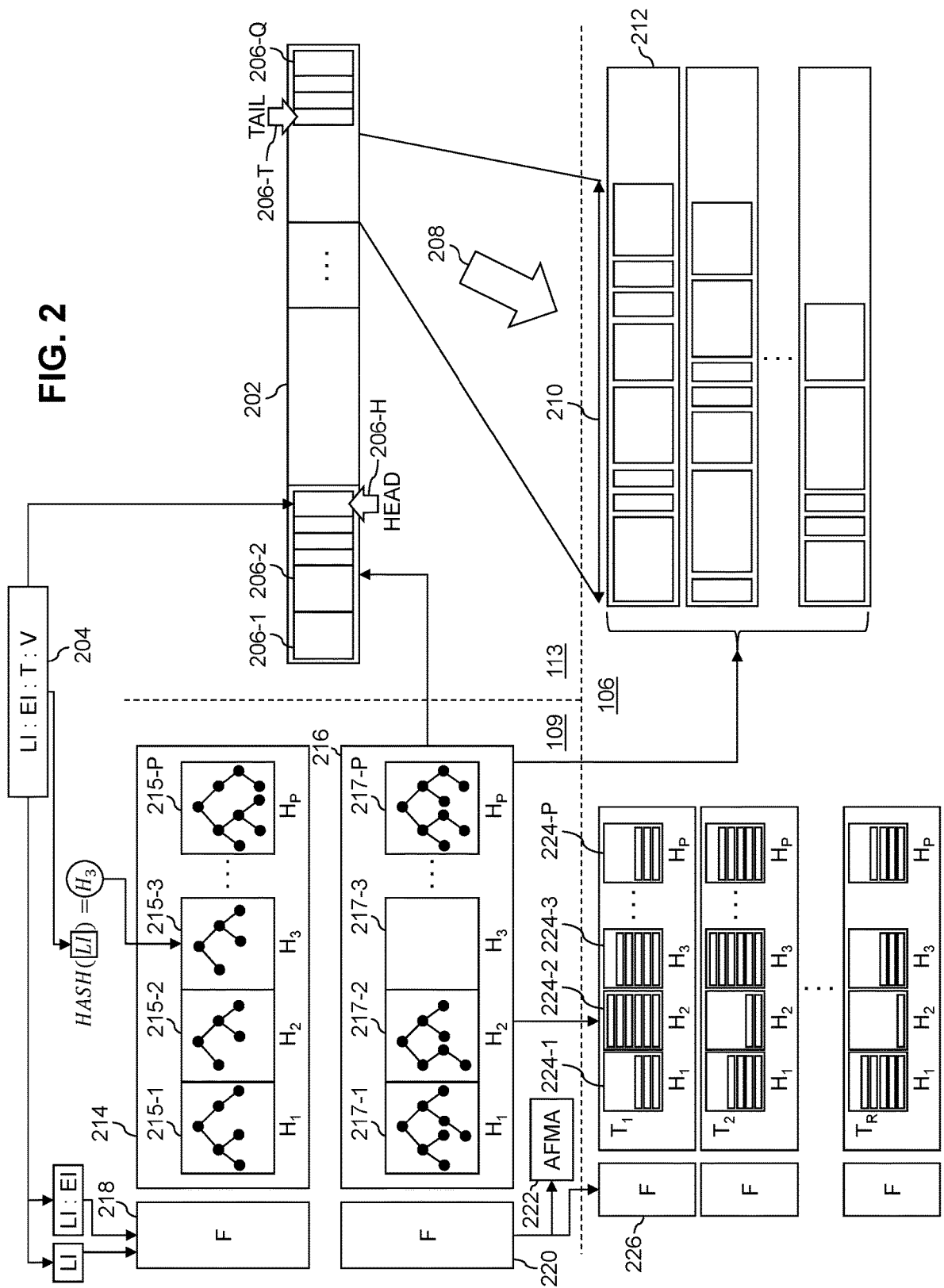
FIG. 2 is a block diagram of an example delta log architecture of the storage array of FIG. 1 in an illustrative embodiment.

With reference now to FIG. 2, storage system 105 may implement a delta log architecture which tracks changes in the metadata 112 using a raw delta log 202 which comprises changes to metadata pages, also referred to herein individually or collectively as deltas 204. In some embodiments, the raw delta log 202 is maintained in the NVM devices 113 of the storage system 105. The raw delta log 202 may, for example, be stored in a similar manner to a write journal of the storage system 105 on one or more of the storage devices 106 that are designated to act as NVM devices 113. In some embodiments, the raw delta log 202 may comprise a ring buffer. When metadata pages are changed, the deltas 204 are written as entries 206-1, 206-2 . . . 206-Q to the raw delta log 202. For example, the deltas 204 may be written to the raw data log 202 sequentially or in any other manner.

As seen in FIG. 2, raw delta log 202 comprises entries 206 of deltas 204. In a case where the raw delta log 202 is a ring buffer, the raw delta log 202 comprises a plurality of entries 206 including a head 206-H and a tail 206-T. For example, the head 206-H and tail 206-T may comprise pointers or other constructs that point to the most recent and least recent entries 206 of the raw data log 202. As new changes to the metadata are made, corresponding deltas 204 are added to the head of the raw delta log 202 the head 206-H is adjusted to point to the most recent entry 206.

As the raw delta log 202 fills up or overflows, some or all of the entries 206 may be optionally demoted or destaged 208 to storage devices 106 of the storage system 105 as one or more raw delta log chunks 210. For example, the portion of the raw delta log 202 comprising the tail 206-T may be demoted or destaged to the storage devices 106 once the size of the raw delta log 202 reaches a threshold value, e.g., 80% of the total size or any other value. As part of the demotion or destaging process, the tail is adjusted to point to the least recent entry 206 that has not been demoted or destaged. In some embodiments, the demoted or destaged raw delta log chunks 210 may be stored in delta storage logs 212 which each store one or more raw delta log chunks 210. In some embodiments, the delta storage logs 212 may also comprise ring buffers in a similar manner to raw delta log 202. In some embodiments, each delta storage log 212 may comprise a particular size such as, e.g., 2 MB or any other size, and may store up to that size of deltas 204 that are demoted or destaged from the raw delta log 202. For example, the raw delta log 202 may comprise multiple segments of each comprising multiple entries 206. During the demotion or destaging, a portion of the raw delta log 202 is copied to the delta storage logs 212, e.g., a portion having the particular size.

During a restart of the storage system 105, both the raw delta log 202 and the delta storage logs 212 may be utilized during reconstruction of the corresponding metadata pages. In some embodiments, the raw delta log 202 and corresponding delta storage logs 212 may be utilized as write only objects, for example, for use in reconstructing metadata pages in the event of a loss of data due to a restart or other issue in the storage system 105.

A delta 204 comprises information such as, e.g., a logical index (LI) of the metadata page being changed, an entry index (EI) of an updated entry inside the metadata page, a record type (T), and a new value (V) for the entry at the entry index. In some embodiments, a delta 204 comprises a tuple of the information such as, e.g., a tuple LI:EI:T:V. In some embodiments, a delta 204 comprises data necessary to reconstruct a changed metadata page while having a much smaller size than the changed metadata page itself.

As mentioned above, a delta 204 is written to the raw delta log 202 when a corresponding page of metadata 112 has changed. In addition, with continued reference to FIG. 2, the delta log architecture of the storage system 105 comprises hash-based sorted buckets (HBSBs) 214, HBSBs 216 and filters 218 and 220 corresponding to the respective HBSBs 214 and 216 which are utilized by the controller 108 of the storage system 105 to determine whether or not there are any deltas 204 for a given page of metadata 112. In some embodiments, HBSBs 214, HBSBs 216 and filters 218 and 220 are stored in cache 109.

An HBSB 214 comprises buckets 215-1, 215-2, 215-3 . . . 215-P each of which is configured to store a binary tree of deltas 204. In some embodiments, the deltas 204 are sorted into the buckets 215 using the LI for that delta 204, for example via a hash table. For example, a hash H of the LI for a delta 204 is generated, e.g., using a hashing algorithm such as SHA-1 or any other hashing algorithm, and each bucket 215 may correspond to one hash, e.g., $H_1$, $H_2$, $H_3$ . . . $H_P$. The bucket 215 corresponding to a particular hash H contains a binary tree of deltas that corresponds to the delta 204 from which the hash H was generated. For example, when a delta 204 is written to the raw delta log 202, it is also added to the HBSB 214 in the binary tree of the bucket 215 corresponding to the hash H of the LI of that delta 204. If no metadata has changed that corresponds to a particular bucket 215, the bucket 215 may not yet have any deltas 204 in its binary tree, for example, as seen with bucket 215-3 in FIG. 2. An HBSB 214 or 216 that is actively being used by the storage controller 108 for storing deltas 204 is also referred to herein as an active HBSB while an HBSB 214 or 216 that is destaging data to the storage devices 106 is also referred to herein as a destage HBSB.

In some embodiments, the buckets 215 may each comprise, for example, 4K to 8K of deltas 204 stored in a binary tree. Other sizes of deltas 204 may alternatively be stored in the binary tree of each bucket 215.

With continued reference to FIG. 2, in one example scenario, a delta 204 that corresponds to a change in a page of metadata 112 is obtained by the storage controller 108. For example, the storage controller 108 may generate the delta 204 for a change to a page of metadata 112 when servicing a write IO operation. The delta 204 is added to the head 206-H of the raw delta log 202, as described above. In addition, the storage controller 108 generates a hash $H_3$ of the LI of the delta 204 and determines the corresponding bucket 215-3 based on the generated hash $H_3$. For example, as illustrated in FIG. 2, the hash of the LI of delta 204 is $H_3$ and the corresponding bucket 215-3 is selected. The delta 204 is added to the binary tree for bucket 215-3. In some embodiments, the deltas 204 in the binary tree are sorted based on LI.

Figure 3:
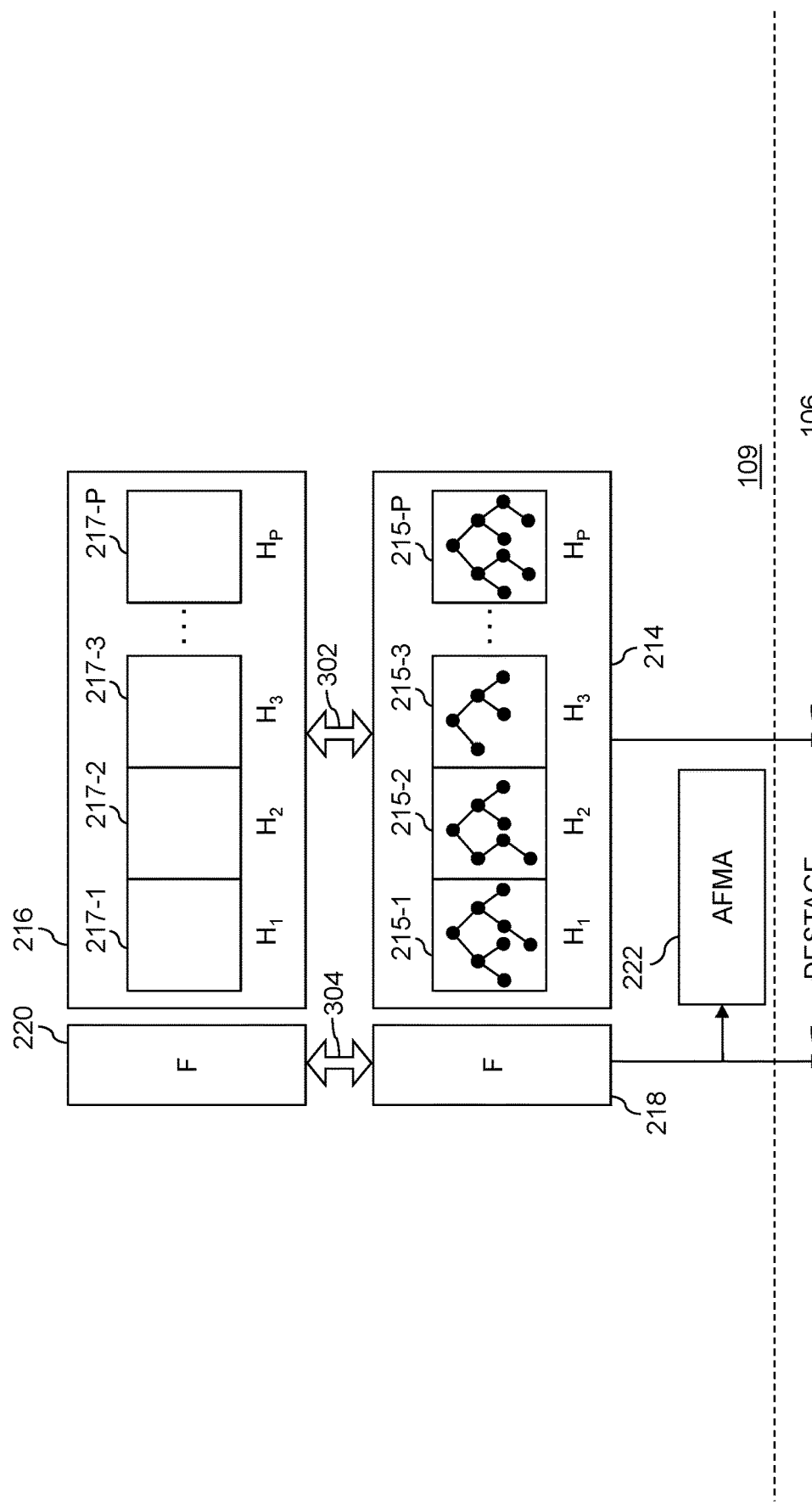
FIG. 3 is a block diagram of an example portion of the delta log architecture of FIG. 2 in an illustrative embodiment.

With reference now to FIG. 3, when the HBSB 214 is full, e.g., the amount of data stored in the HBSB 214 meets a threshold size such as, e.g., 80% of the max size of HBSB 214, 90% of the max size of HBSB 214, 100% of the max size of HBSB 214 or any other threshold size, the HBSB 214 is swapped with a corresponding empty HBSB 216 as denoted by the double-sided arrow 302 in FIG. 3. HBSB 216 comprises buckets 217-1, 217-2, 217-3 . . . 217-P which correspond to the same hashes $H_1$, $H_2$, $H_3$ . . . $H_P$ as the buckets 215-1, 215-2, 215-3 . . . 215-P of the HBSB 214. When the HBSB 214 becomes full, the HBSB 214 is swapped with the HBSB 216, i.e., HBSB 216 becomes the active HBSB and HBSB 214 becomes the destage HBSB. The HBSB 214 then begins destaging the deltas 204 from its buckets 215 of binary trees to the storage devices 106, as will be described in more detail below. The now active HBSB 216, which is empty after already destaging its data to the storage device 106, begins receiving and storing deltas 204 for new changes to the metadata 112 in the binary trees of its buckets 217 in a similar manner that shown for HBSB 214 in FIG. 2.

By adding the deltas 204 to buckets 215 based on a hash H of their LI and then locating them in the binary tree according to their LI, any time a page of metadata 112 having a particular LI is changed, the delta 204 will be added to the same bucket 215 and sorted. This allows the storage controller 108 to efficiently search for changes to a particular page of metadata 112 by only searching in the HBSB bucket 215 that corresponds to the hash H of the LI for that page of metadata 112. In addition, because the deltas 204 are sorted within the binary tree of the HBSB bucket 215 by their LI, the storage controller 108 can also efficiently search the binary tree of the HBSB for entries corresponding to that page of metadata 112. By distributing the deltas 204 between buckets 215 in sorted binary trees based on the hashing of LIs, each individual HBSB bucket 215 may be maintained in a compact format which decreases the processing burden on the controller 108 when sorting and searching for deltas 204 related to a particular page of metadata 112. Buckets 217 are configured in a similar format to buckets 215 and are searchable by the storage controller 108 in a similar manner.

With reference again to FIG. 2, filters 218 and 220 may comprise, for example, bloom filters or other kinds of filters, that may be utilized by the storage controller 108 to quickly determine whether or not there are deltas 204 for a particular page of metadata 112 in the HBSBs 214 and 216, where each HBSB 214 or 216 has a corresponding filter 218 or 220. In some embodiments, filters 218 and 220 comprise data structures, such as, e.g. tables, comprising entries that correspond to deltas 204. For example, if an entry corresponding to a delta 204 is present, the storage controller 108 will know that changes to a corresponding page of metadata 112 need to be taken into account when servicing an IO operation involving that corresponding page of metadata 112 and will look up the deltas for those changes in the corresponding HBSB 214 and 216. In some embodiments, filters 218 may comprise multiple entries for the same delta 204, as will be described in more detail below.

For example, as seen in FIG. 2, when a new delta 204 is generated by the storage controller 108 and added to an HBSB 214, two entries are added to the corresponding filter 218, one with the LI of the delta 204 as the key and one with the tuple LI:EI of the delta 204 as the key. This allows the storage controller 108 to quickly search through the filter 218 for both the specific delta entry (using the LI:EI tuple as a key) and also for all deltas related to the page of metadata 112 (using just the LI as a key). If any deltas are found, the storage controller 108 may then traverse the binary tree in the corresponding bucket or buckets 115 of the HBSB 214 to obtain the changes that need to be considered when servicing an IO operation associated with that page of metadata 112. When an HBSB 214 is swapped with an empty HBSB 216 for destaging, the filter 218 is also swapped with a corresponding empty filter 220, as denoted by the double-sided arrow 304 in FIG. 3.

Filters 218 and 220 decrease the number of searches that are required for the storage controller 108 to determine whether or not HBSBs 214 or 216 contain deltas 204 for a particular page of metadata 112. For example, the filters 218 and 220 allow the storage controller 108 to perform relatively inexpensive processing operations such as, e.g., searching a table using a key, to determine whether or not deltas 204 associated with a particular page of metadata 112 are contained in the corresponding HBSBs. For example, the storage controller 108 may utilize false positive logic with the filters 218 and 220 to determine whether or not deltas 104 associated with a particular page of metadata 112 are stored in the corresponding HBSBs 214 or 216.

With reference to FIGS. 2 and 3, when the HBSB 214 or 216 is destaged to the storage devices 106, the corresponding filter 218 or 220 is copied to an active filter memory area (AFMA) 222 of the cache 109. AFMA 222 comprises active filters corresponding to HBSBs that have been destaged. The AFMA 222 allows the storage controller 108 to perform in-memory operations to determine whether or not any deltas 204 for a particular page of metadata 112 have been destaged to the storage devices 106.

With reference again to FIG. 2, when HBSBs are destaged to the storage devices 106, corresponding tablets $T_1$, $T_2$ . . . $T_R$ are generated on the storage devices 106. In some embodiments, tablets T are logically the same as the corresponding in-memory HBSBs 214 and 216 but are configured with buckets 224 having a different format, e.g., an array of sorted deltas 204 instead of a binary tree of deltas 204. In other embodiments, the same bucket format may be utilized for HBSBs 214 and 216 and tablets T.

A new tablet T may be generated for each time an HBSB is destaged to the storage devices 106. In other embodiments, an empty tablet T may be utilized where, for example, the empty tablet T has completed the destage process as will be described in more detail below.

As an HBSB fills up and is swapped with an empty destage HBSB, which becomes an active HBSB as described above, the full HBSB may then be destaged to a tablet T, e.g., tablet $T_2$ until empty. When the now active HBSB fills up it will be swapped with the now empty HBSB and will also be destaged to another tablet T, e.g., tablet $T_1$, until empty. In this manner, the deltas stored in each HBSB are destaged to corresponding tablets T on the storage devices 106.

With reference again to FIG. 2, for example, HBSB 214 is currently an active HBSB which is receiving new deltas 204. HBSB 216 is currently a destage HBSB which is destaging its deltas 204 to the table $T_1$ of the storage devices 106.

The destaging of HBSB 216 may comprise multiple phases. In an example first phase, the buckets 217 of the destage HBSB 216 are written to corresponding buckets 224 of a tablet T on the storage devices 106. For example, as shown in FIG. 2, the buckets 217-1, 217-2, 217-3 . . . 217-P of the illustrated HBSB 216 are written to corresponding buckets 224-1, 224-2, 224-3 . . . 224-P of a corresponding tablet $T_1$ on the storage devices 106. In the first phase, the binary trees of the buckets 217 are converted to sorted sets of deltas 204 for storage in the buckets 224 of the corresponding tablet T. The sorting may be based on the LI of the deltas 204. For example, tablet $T_1$ may comprise a bucket 224-1 having the same deltas 204 that are found in the binary tree of bucket 217-1 but sorted by LI into an array of deltas 204.

When several deltas 204 related to the same LI are destaged to a tablet T, the entries may also be sorted according to the respective times at which their changes to a page of metadata 112 occurred. This sorting process is low cost and lightweight due to the binary tree nature of the HBSB buckets 117. In some embodiments, the size of each bucket 224 in the tablets T is the page size of the storage system 105, e.g., 4K or any other page size value, which guarantees that no more than one read operation is required to read an entire bucket 224.

The filter corresponding to the HBSB that is being destaged is also copied to the storage devices 106 during the destaging process in addition to the AFMA 222 of the cache 109. For example, when HBSB 216 is destaged to the tablet $T_1$ of the storage devices 106, filter 220 is also destaged to a filter 226 that corresponds to tablet $T_1$. During the normal flow of servicing an IO operation, the filter 226 is not utilized by the storage controller 108 to determine whether or not there are any deltas 204 stored in tablets T on the storage devices 106 that need to be taken into account. Instead, the copy of the filter stored in the AFMA 222 is used. Instead, filter 226 is utilized in the event that a reconstruction of the filters stored in the AFMA 222 is required, for example, during a restart of some or all of the storage system 105 including the cache 109.

Figure 4:
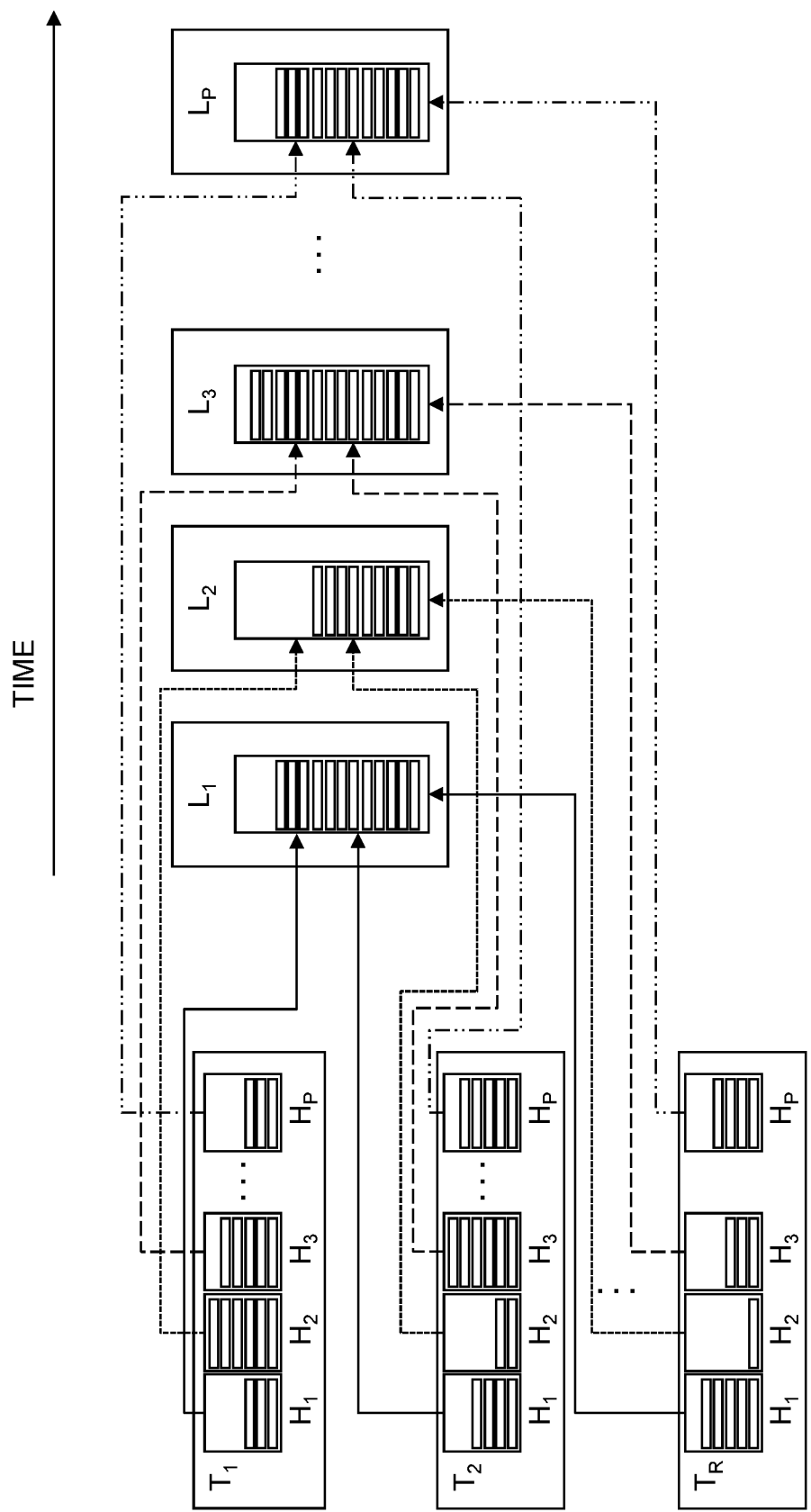
FIG. 4 is a block diagram of an example first portion of a destage functionality of the delta log architecture of FIG. 2 in an illustrative embodiment.
Figure 5:
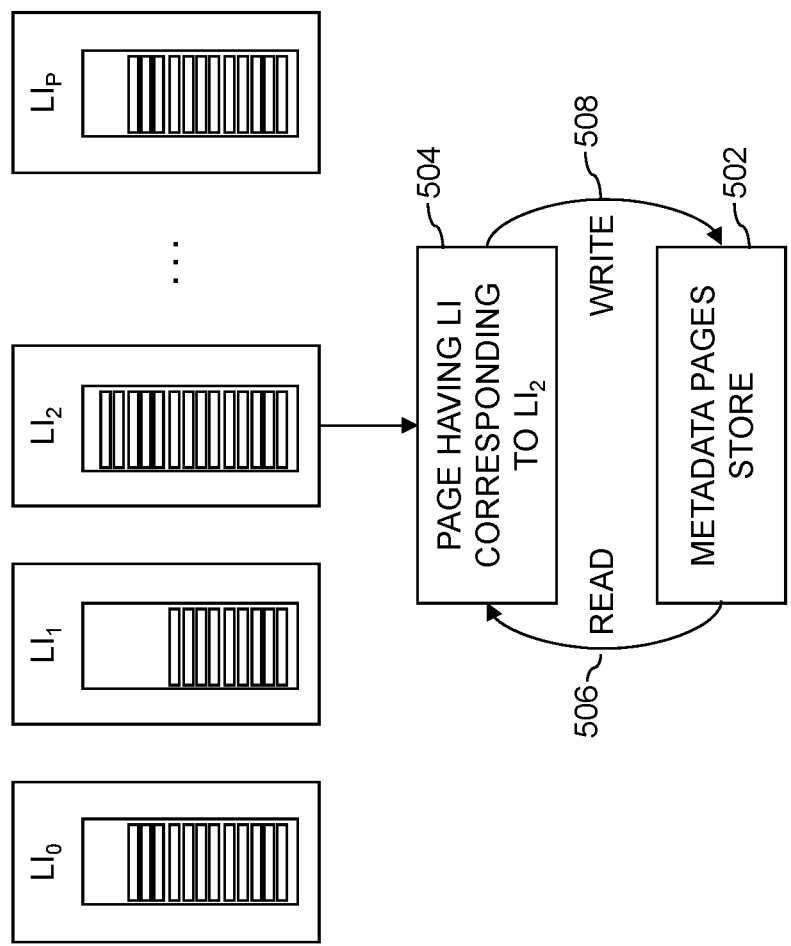
FIG. 5 is a block diagram of an example second portion of the destage functionality of the delta log architecture of FIG. 2 in an illustrative embodiment.

With reference now to FIGS. 4 and 5, during the second phase of the destage process, for each hash H, the deltas 204 of the corresponding buckets are read from each active tablet T. For example, the buckets corresponding to hash $H_1$ in each tablet T are read and all deltas 204 related to the same LI are merged into a merged bucket $LI_1$, the buckets corresponding to hash $H_2$ in each tablet T are read and all deltas 204 related to the same LI are merged into a merged bucket $LI_2$, the buckets corresponding to hash $H_3$ in each tablet T are read and all deltas 204 related to the same LI are merged into a merged bucket $LI_3$, . . . and the buckets corresponding to hash $H_P$ in each tablet T are read and all deltas 204 related to the same LI are merged into a merged bucket $LI_P$, as shown for example, in FIG. 4.

The mergers of the deltas 204 in the buckets for each hash H into a merged bucket $LI_X$ may be performed over time to reduce the per cycle cost of the destage process. For example, the merger of the deltas 204 of the buckets corresponding to hash $H_1$ may be performed during a first cycle of the storage controller 108, the merger of the deltas 204 of the buckets corresponding to hash $H_2$ may be performed during a second cycle of the storage controller 108, and so on.

The time order of the deltas 204 between tablets T is preserved during the merge process such that the deltas 204 are sorted within the merged bucket $LI_X$ in time order.

With reference now to FIG. 5, as part of the second phase of the destage process, the pages of metadata 112 having LIs corresponding to the merged buckets $LI_X$ are read from a metadata pages store 502 of the storage devices 106. All of the deltas 204 in the merged buckets $LI_X$ corresponding to those LIs are merged or replayed to their corresponding pages of metadata 112 in time order and the updated pages are then written back to the metadata pages store 502, overwriting the corresponding pages of metadata 112 in the metadata pages store 502. For example, as seen in FIG. 5, a page 504 of metadata 112 having an LI corresponding to merged bucket $LI_2$ is read 506 from metadata pages store 502. All of the deltas 204 found in merged bucket $LI_2$ are merged or replayed to the page 504 to update the page 504 with the latest metadata and page 504 is then written 508 back to the metadata pages store 502, overwriting the version of page 504 in the metadata pages store 502 with the latest version of the metadata page 504 as updated.

After the second phase of the destage process is completed, the destaged tablets T and merged buckets $LI_X$ are freed up, deleted, or otherwise made available for further use by the storage controller 108. The corresponding filters 226 are also freed up, deleted, or otherwise made available for further use by the storage controller 108. In addition, the corresponding filters that were stored in the AFMA 222 are also freed up, deleted, or otherwise made available for further use by the storage controller 108.

During a read flow, e.g., when a read IO operation is received by the storage system 105 for servicing by the storage controller 108, a reconstruction process to reconstruct an up-to-date metadata page that corresponds to the read IO operation needs to be performed by the storage controller 108. Such a reconstruction process for a metadata page may comprise a number of steps including, for example, identifying one or more metadata pages that correspond to the read IO operation, obtaining the identified metadata pages from the metadata pages store 502 of the storage devices 106, determining whether or not there are any outstanding deltas 204 for the identified metadata pages and merging or replaying any such deltas 204 with the identified metadata pages obtained from the metadata pages store 502.

The storage controller 108 is configured to determine whether or not there are any deltas 204 for the identified metadata pages by searching through the active HBSBs, destage HBSBs, and tablets T for any corresponding deltas 204. With reference to FIG. 2, in one example search algorithm, the filter 218 for the active HBSB, e.g., HBSB 214 in FIG. 2, may be searched for the LIs of the identified metadata pages. If an entry for one or more of the LIs are found, the binary trees of the corresponding buckets 215, as identified by the hash of the LIs corresponding to the entries, may be searched by the storage controller 108 for any deltas 204 corresponding to the identified metadata pages. These deltas are then added to a merge set in time order, for example, in a manner similar to merged buckets $LI_X$ as described above. A similar process may also be performed for filter 220 and destage HBSB, e.g., HBSB 216 in FIG. 2.

In addition, for each active tablet T, the LIs of the identified metadata pages are also checked in the corresponding filters stored in the AFMA 222. If an entry corresponding to one of the LIs is found for a particular tablet T, the deltas 204 found in the bucket 224 corresponding to the hash H of that LI are read from the tablet T and also added to the merge set for that metadata page in time order.

The deltas 204 in the merge sets are then merged with the corresponding metadata pages that were obtained from the metadata page store 502 in time order to generate the latest metadata pages for use by the read IO operation. In some embodiments, the generated metadata pages may then be written to the metadata page store 502 to overwrite any old versions of the metadata pages.

In this manner, changes to a metadata page may be tracked and easily searchable while deferring the destaging of the metadata page deltas in a manner that allows for the metadata page to be reconstructed to a latest version for use by the storage controller 108 when a read IO operation that requires use of the metadata page is received.

With reference again to FIG. 1, the host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

It is to be appreciated that these and other features of illustrative embodiments are presented by way of example only and should not be construed as limiting in any way.

Accordingly, different numbers, types and arrangements of system components such as host devices 102, network 104, storage system 105, storage devices 106, storage controller 108, datasets 110 and metadata logic 114 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for lockless metadata binary tree access can be implemented in the storage system, in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

As described above with reference to FIG. 2, a storage system that utilizes a delta log architecture maintains metadata page deltas 204 in-memory in buckets 215 of volatile binary tree structures. Such a storage system typically requires access to these deltas 204 for many of its storage operations as part of either the front end or background processes. This is the case since any metadata page access will typically involve the application of the relevant deltas 204 to construct the latest version of that metadata page. As mentioned above, the deltas 204 are stored in-memory in buckets, e.g., buckets 215 and 217 of HBSBs 214 and 216 where each bucket comprises a binary tree of deltas ordered by the LI of the corresponding metadata page. Such a configuration provides the storage controller 108 with an efficient way to search for the relevant deltas 204.

When accessing the binary tree of a particular bucket, a storage system typically guarantees the consistency of the binary tree through the use of a bucket or binary tree spinlock, which prevents the binary tree from being changed during the access. However, such a bucket spinlock may result in serious contention issues in the system since most storage operations will require access to metadata pages and thus access to the corresponding HBSB buckets. Such contention issues may increase the latency and degrade the performance of the storage system when the storage system is waiting on the completion of one IO operation to service another IO operation due to a bucket spinlock on a bucket corresponding the LIs used by both IO operations. This is especially true in the case where the buckets are large, i.e. aggregate large amounts of deltas 204, or the HBSB has a relatively small number of buckets which results in the deltas 204 of more pages falling in each bucket.

As an example, in a write scenario, where a new delta needs to be added to the binary tree of a bucket, the corresponding binary tree is traversed to the location for the insertion, e.g., based on the metadata page LI, and the delta is inserted into the proper place.

In a read scenario, where a metadata page needs to be read for an IO operation, an up-to-date metadata page needs to be reconstructed. For example, the reconstruction may comprise obtaining the metadata page from the metadata pages store 502 on the storage devices 106, finding all of the related deltas 204 to that metadata page in the HBSBs 214 and 216 and tablets T and merging or replaying them on obtained metadata page in time order, as described above.

In order to find all of the related deltas for the metadata page to be reconstructed, the storage controller 108 must traverse the binary trees of any buckets that correspond to the LI of the metadata page, where those buckets are indicated in the filters to have deltas associated with that LI.

In general, each specific bucket can be accessed by several threads concurrently, so each bucket is typically protected by a bucket spinlock to provide consistency during traverse, insertion and searching processes since a change to the binary tree by one thread during the traverse of the binary tree by another thread may result in corruption, loss of data, or other failures. This is especially important in some use cases since there is a high probability that a binary tree which holds deltas 204 for recent changes, i.e., writes, will also typically be read by the same application shortly thereafter. Because of this, a system that utilizes bucket spinlocks can suffer from serious contention issues as mentioned above.

In illustrative embodiments, metadata logic 114 implements functionality for lockless metadata binary tree access. As use herein, lockless refers to the accessing of a metadata binary tree for reading data from the metadata binary tree without requiring a spinlock on the entire metadata binary tree of the bucket. The metadata logic 114 enables the storage controller 108 to search through the binary tree of a bucket for a read operation without requiring a bucket spinlock to protect the consistency of the binary tree, even when a write operation to insert a new node into the tree is in progress.

The functionality for lockless metadata binary tree access is based on a number of assumptions. First, that the most common and essential type of binary tree access is a read access to search the binary tree for deltas corresponding to a metadata page based on its LI. Second, that all read or write operations involving a specific metadata page are protected by a logical level lock such as, e.g., a page lock or a write cache lock for the LI of that metadata page, to provide general high-level operation consistency. In other words, the functionality for lockless metadata binary tree access takes advantage of the assumption that the upper layer guarantees that write operations on same metadata page LI are exclusive, while read operations are allowed to be concurrent. Note that the upper layer lock does not prevent two concurrent write/insert operations on the same bucket binary tree that are related to different metadata page LIs.

Accordingly, when the storage controller 108 accesses the binary tree of a bucket for a read operation related to a particular metadata page LI, e.g., searches for deltas 204 related to the particular metadata page LI, the upper layer guarantees that no new deltas related to this LI will be added to the binary tree concurrently with the read operation since this metadata page LI is protected by the upper layer shared page lock. It is important to note that the bucket binary tree may still be updated concurrently by a write operation related to another metadata page LI that happens to fall into the same bucket based on the hash. For example, if a binary tree of a bucket is being accessed for a read operation associated with a metadata page having a first LI, the same binary tree may also be accessed for a write operation associated with another metadata page having a second LI that hashes into the same bucket since the upper level shared page lock is based on the LI, not the bucket. Thus, the upper layer page lock protects the binary tree from concurrent read or write operations associated with the same metadata page LI but does not protect the binary tree from concurrent read or write operations associated with two different metadata page LIs.

The only remaining reason for enforcing a bucket or binary tree level spinlock in the read flow is to provide a consistent read traverse of the binary tree. This means that the storage controller 108 must guarantee a predictable crash-protected traverse of the binary tree even in a case where the binary tree is updated to include a new delta node in the traverse route at the time of the traverse.

The functionality for lockless metadata binary tree access implemented in metadata logic 114 comprises a binary tree delta insertion algorithm that is configured to allow consistent traversing of the binary tree even when concurrently inserting a new delta node. By utilizing this functionality, the need to utilize a bucket spinlock for read operations is removed and read operations may traverse the binary tree even while write operations are adding new delta nodes to the binary tree without worry about a crash or corruption during the traverse due to an insertion.

With reference to FIGS. 6-11, example binary tree delta node insertion and read traverse algorithms according to the functionality for lockless metadata binary tree access implemented by metadata logic 114 will now be described.

When a write IO operation is obtained by the storage controller 108, a corresponding metadata page often requires changes to reflect any written data. The metadata logic 114 identifies the corresponding metadata page and generates a delta 204 for the change. The metadata logic 114 performs a hashing operation on the LI of the metadata page to generate a hash H which is used to identify a target bucket of the active HBSB. For example, as shown in FIG. 2, the hash $H_3$ is generated from the LI in the delta 204 which identifies bucket 215-3 of the active HBSB 214 as the bucket that contains a binary tree of deltas 204 for the corresponding metadata page LI.

Figure 6:
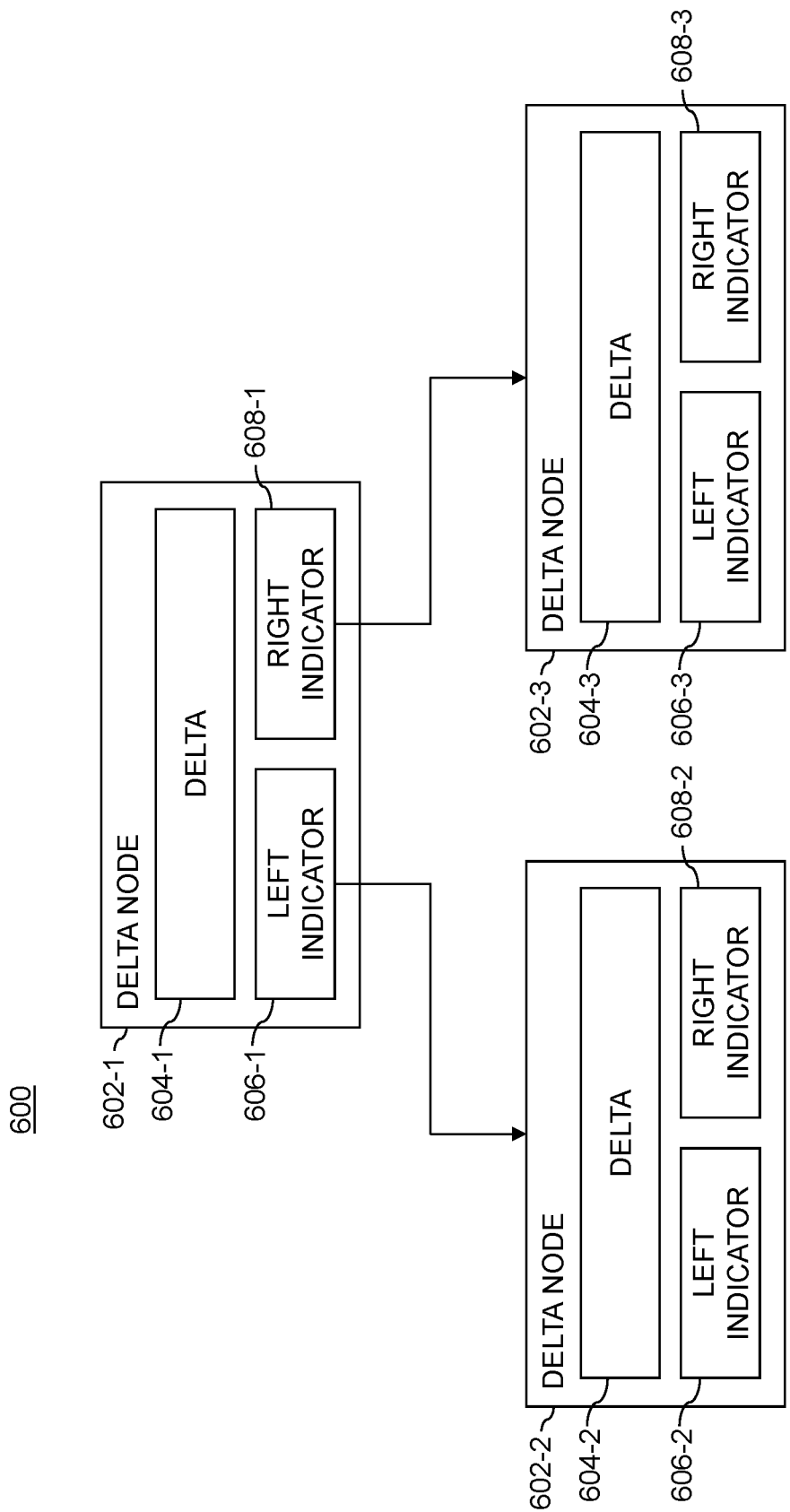
FIG. 6 is a block diagram of an example binary tree of the delta log architecture of FIG. 2 in an illustrative embodiment.

With reference to FIG. 6, an example binary tree 600 comprises delta nodes 602-1, 602-2 and 602-3. Any other number of delta nodes 602 may be present in a binary tree. Each delta node 602 comprises three fields, a payload 604, a left indicator 606 and a right indicator 608. For example, as seen in FIG. 6, delta node 602-1 comprises a payload 604-1, a left indicator 606-1 and a right indicator 608-1, delta node 602-2 comprises a payload 604-2, a left indicator 606-2 and a right indicator 608-2 and delta node 602-3 comprises a payload 604-3, a left indicator 606-3 and a right indicator 608-3. Each payload 604 comprises a delta 204. The left indicators 606 and right indicators 608 indicate which delta nodes 602 are next in the binary tree if such delta nodes 602 exist. For example, the left indicator 606-1 of delta node 602-1 indicates that delta node 602-2 is the next delta node 602 on the left branch while right indicator 608-1 indicates that delta node 602-3 is the next delta node 602 on the right branch. As can be seen from FIG. 6, there are no further delta nodes 602 branching off of delta nodes 602-2 and 602-3, so the left and right indicators 606 and 608 of those delta nodes 602 do not indicate any further delta nodes 602. For the purposes of the example above, bucket 215-3 may comprise the example binary tree 600.

Figure 7:
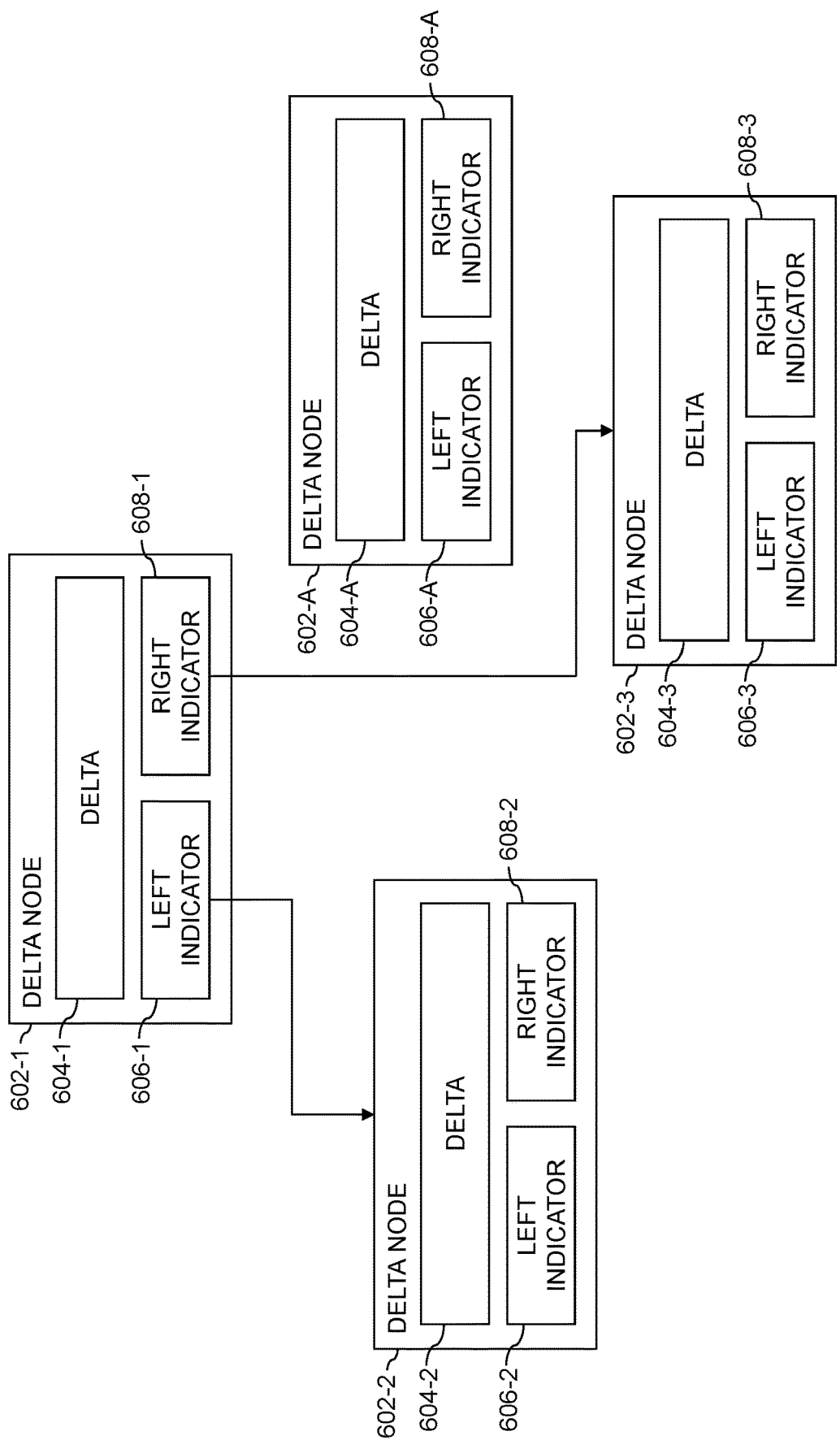
FIG. 7 is a block diagram of the example binary tree of FIG. 6, illustrating the generation of a new delta node in an illustrative embodiment.

With reference now to FIG. 7, metadata logic 114 allocates a new delta node 602-A to be inserted into the binary tree 600 and fills the node payload 604-A with the generated delta 204. The delta node 602-A may be generated separate from the binary tree 600 prior to insertion. The metadata logic 114 acquires a bucket binary tree spinlock for the binary tree 600 and traverses the binary tree to find the appropriate insertion location for the delta node 602-A, for example, based on the metadata page LI found in the delta 204. In some embodiments, the metadata logic 114 may also acquire an exclusive page lock for the metadata page LI in conjunction with the node insertion process.

Figure 8:
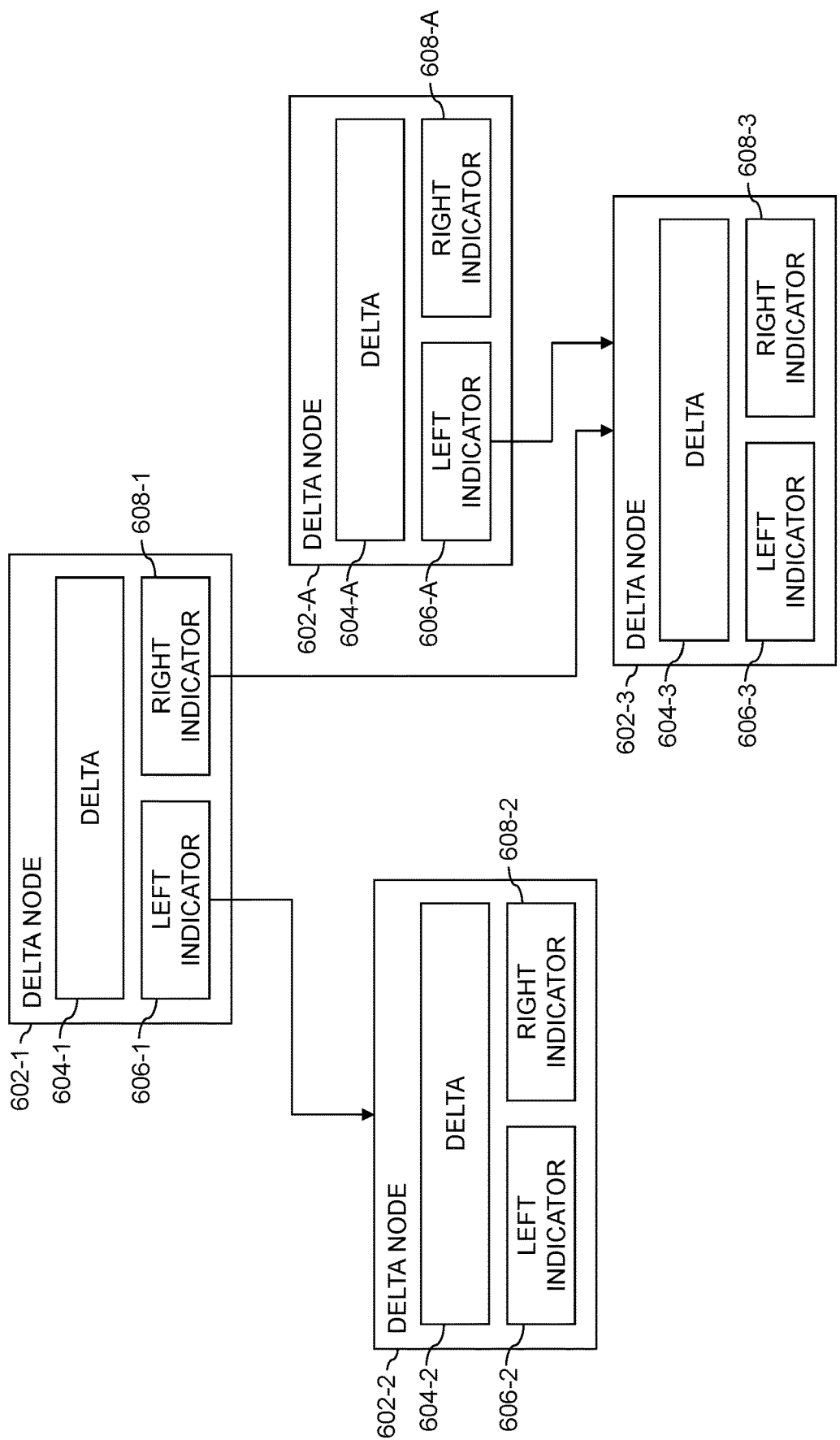
FIG. 8 is a block diagram of the example binary tree of FIG. 6, illustrating a bonding of the new delta node to a child node in the binary tree in an illustrative embodiment.

With reference to FIG. 8, metadata logic 114 updates the left indicator 606-A and the right indicator 608-A of the delta node 602-A as necessary to reflect a proper binding within the binary tree 600 at the insertion location. For example, as seen in FIG. 8, the left indicator 606-A of the delta node 602-A is updated to point to delta node 602-3, which is what the right indicator 608-1 of delta node 602-1 points at the insertion point. In this case, the right indicator 608-A is not updated to point to another delta node 602. At this stage the new delta node 602-A is completely built and bonded to the child delta node 602-3 at the insertion point but it is still autonomous and not linked to the parent delta node 602-1, i.e., it is still not part of the binary tree 600.

Figure 9:
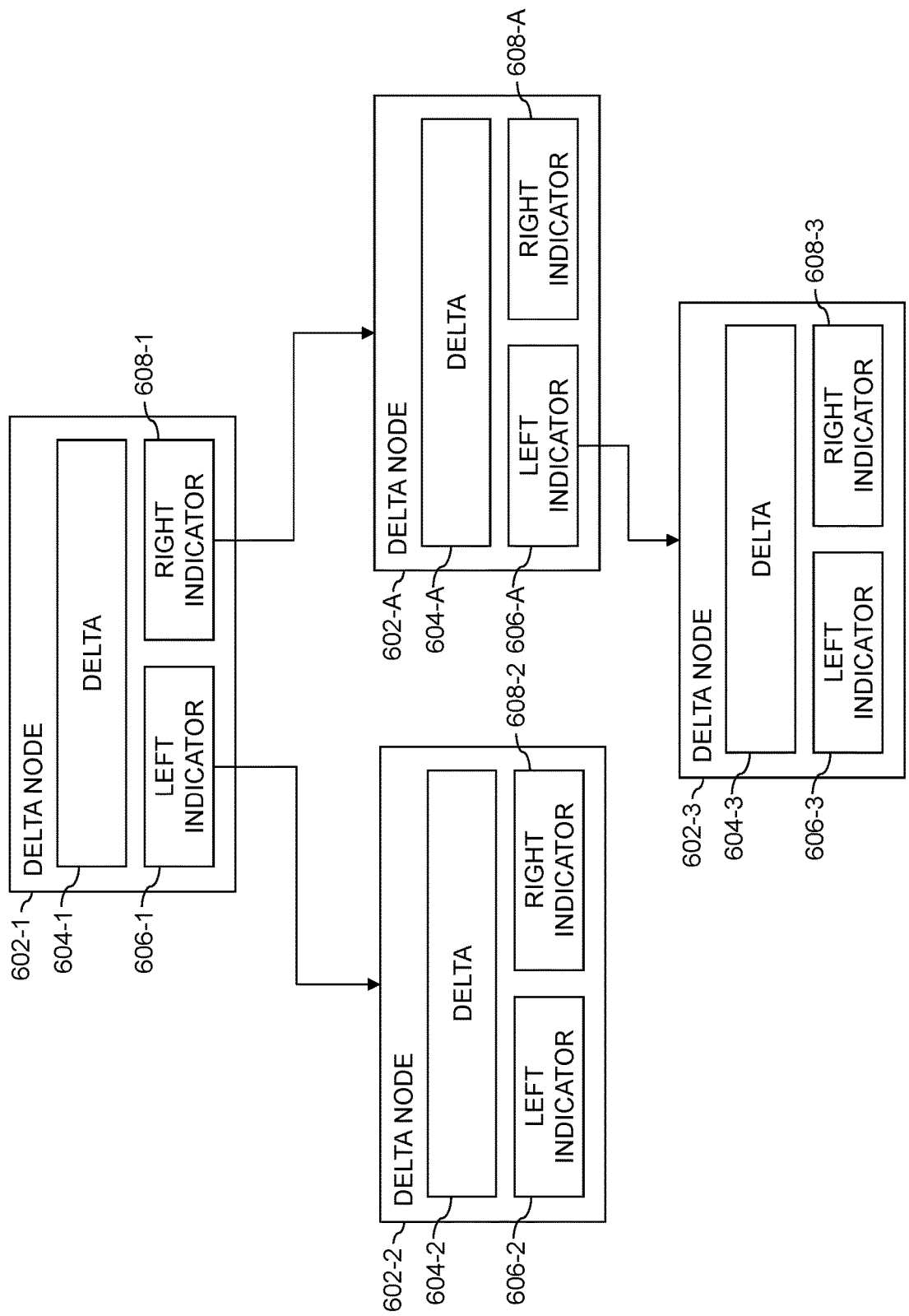
FIG. 9 is a block diagram of the example binary tree of FIG. 6, illustrating an insertion of the new delta node into the binary tree in an illustrative embodiment.

With reference to FIG. 9, metadata logic 114 changes the corresponding indicator of the parent delta node at the insertion point to point to the new delta node. In the above example, right indicator 608-1 of the parent delta node 602-1 is changed to point to the new delta node 602-A. This change may be performed atomically, e.g., in a single processor cycle. In some embodiments, the left indicators 606 and right indicators 608 comprise a pointer of either uint32 or uint64 types which makes the update a naturally atomic operation. The new delta node 602-A is now part of the binary tree 600. Because the change is atomic, a read operation which is traversing the binary tree while the binary tree has a spinlock for the insertion operation will always either proceed from delta node 602-1 directly to delta node 602-3 prior to the insertion or from delta node 602-1 to delta node 602-A after the insertion, but will not run into a situation where the delta node 602-A is partially inserted in a manner that would disrupt the traverse of the binary tree and result in a corrupted traverse.

After the insertion of the new node 602-A is complete, the bucket spinlock and the exclusive page lock on the metadata page LI may be removed.

By utilizing the above described metadata logic 114, the storage controller 108 is able to traverse the binary tree at any time for read operations without requiring a spinlock on the bucket or binary tree so long as a write is not in progress for the same metadata page LI which holds the corresponding exclusive page lock. As mentioned above, this is also referred to as a lockless metadata binary tree access. Example scenarios for lockless metadata binary tree access will now be described.

In a first scenario, metadata logic 114 is performing a read traverse of the binary tree 600. In this scenario, there are no concurrent insertion operations being performed on the binary tree and no bucket binary tree spinlock or exclusive page lock for the corresponding metadata page LI is held. An example of this case is shown in FIG. 6. The metadata logic 114 traverses the binary tree from node to node according to the target metadata page LI to identify each delta relevant to that metadata page. In this case, read traverse consistency is guaranteed because no other operation is modifying the binary tree.

In a second scenario, metadata logic 114 is performing a read traverse of the binary tree 600 while a write operation is in progress to insert a new delta node 602-A for another metadata page LI. In this case, the bucket binary tree spinlock has been obtained for the write operation and an exclusive page lock has been obtained for the other metadata pages LI, but the new delta node 602-A is being inserted outside of the read traverse route. Read traverse consistency is still guaranteed because the new delta node 602-A is not part of the read traverse route for the read operation and therefore does not impact the read traverse.

In a third scenario, metadata logic 114 is performing a read traverse of the binary tree 600 while a write operation is in progress to insert a new delta node 602-A for another metadata page LI. In this case, the bucket binary tree spinlock has been obtained for the write operation, an exclusive page lock has been obtained for the other metadata pages LI and the new delta node 602-A is being inserted into the binary tree 600 along the read traverse route. An example of the second scenario is shown in FIGS. 7-9. In this scenario, read traverse consistency is still guaranteed because the insertion is performed by updating the right indicator 608-1 of the parent node 602-1 atomically. Thus, the read traverse will either occur on the old version of the binary tree 600 before the insertion of the new delta node 602-A, e.g., by traversing from delta node 602-1 to 602-3 using right indicator 608-1 as shown in FIGS. 6-8, or occur on the new version of the binary tree 600 after the insertion of the new delta node 602-A, e.g., by traversing from delta node 602-1 to delta node 602-A using right indicator 608-1 and from delta node 602-A to delta node 601-3 using left indicator 606-A as shown in FIG. 9. In both cases the read traverse will be consistent since both versions of the binary tree are consistent and the new delta node 602-A does not relate to the LI being searched by the read traverse since it is protected by the upper layer LI page lock.

In a fourth scenario, metadata logic 114 is attempting to perform a read traverse of the binary tree 600 while a write operation is in progress to insert a new delta node 602-A for the same metadata page LI. In this case, an exclusive page lock for the metadata page LI corresponding to the read traverse has been obtained for the write operation. This is in addition to the bucket spinlock for the binary tree 600. In this scenario, the read traverse is inhibited by the exclusive page lock while metadata logic 114 inserts the new delta node 602-A into the binary tree. For example, the read traverse may wait to obtain a shared page lock on the metadata page LI until the exclusive page lock has been removed. It is important to note that it is not a bucket level spinlock that inhibits the read traverse, but rather the specific exclusive page lock associated with that metadata page LI. For example, read traverse operations corresponding to other metadata page LIs may still be performed even though the read traverse corresponding to the metadata page LI for which the new delta node 602-A is being inserted is inhibited.

Therefore, metadata logic 114 provides lockless read access to the bucket binary tree that dramatically reduces contention on the bucket spinlock which improves overall performance of the storage system 105.

Figure 10:
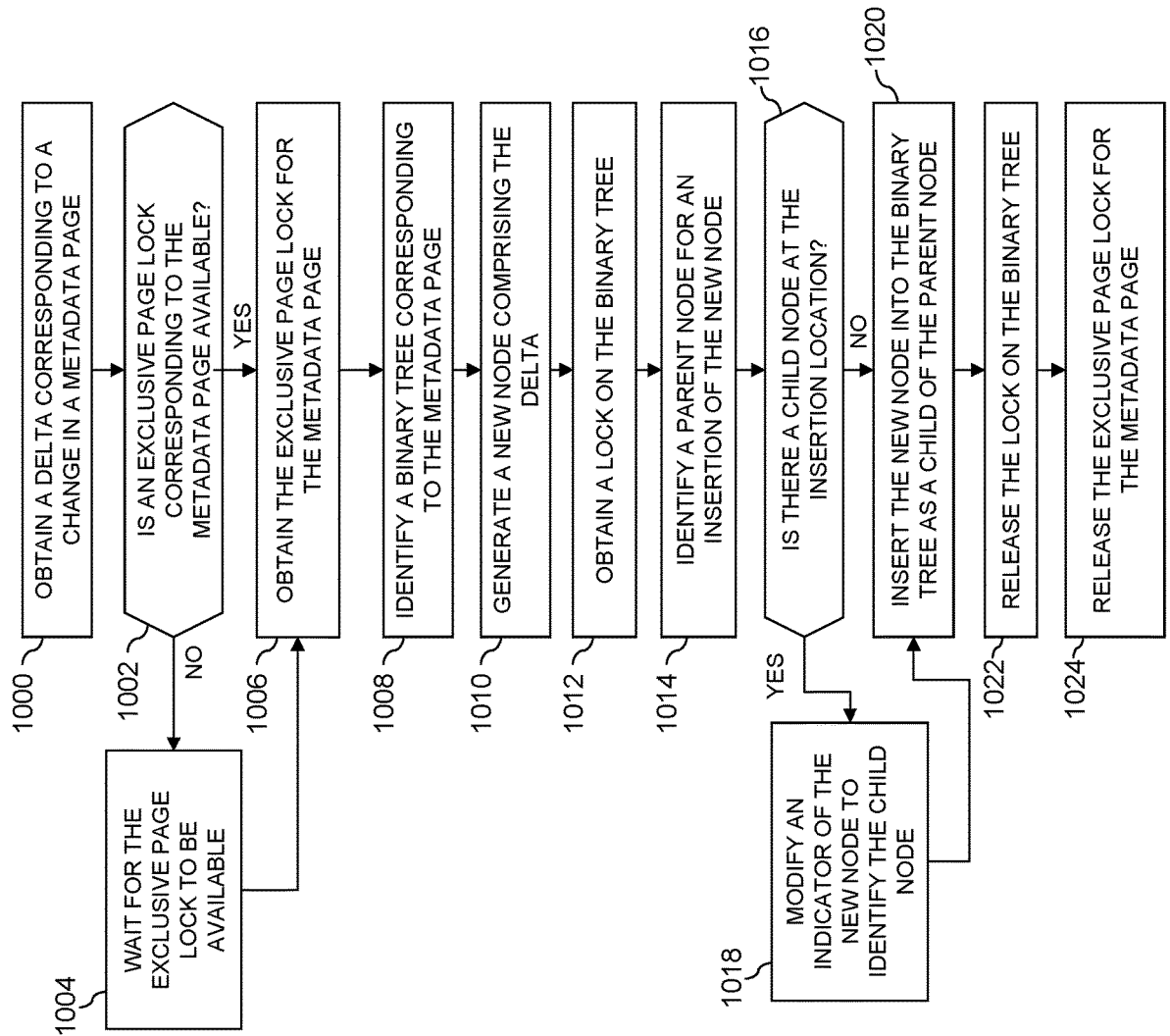
FIG. 10 is a flow diagram of an example process for inserting a delta node into a binary tree according to the lockless metadata binary tree access functionality in an illustrative embodiment.
Figure 11:
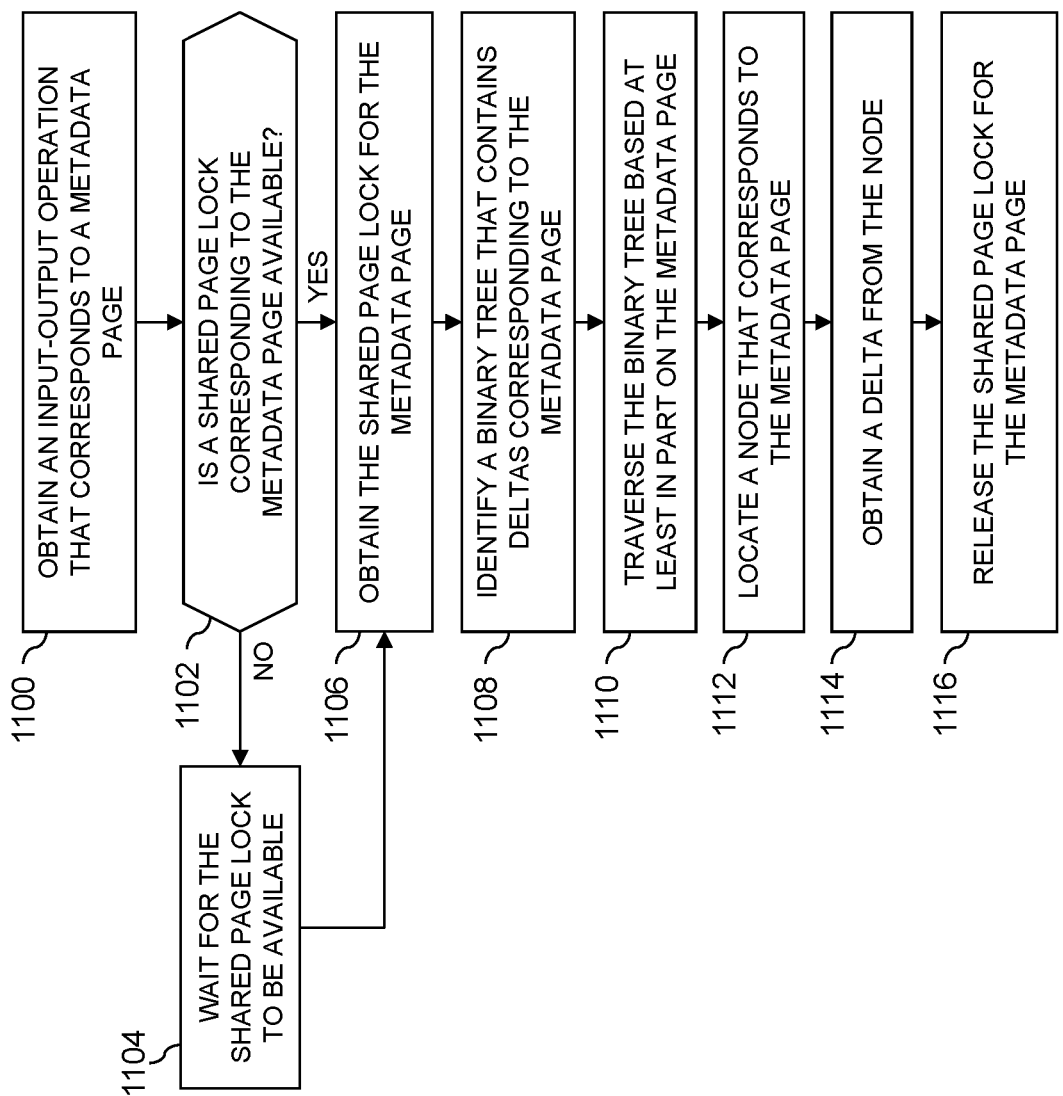
FIG. 11 is a flow diagram of an example process for read traversing a binary tree according to the lockless metadata binary tree access functionality in an illustrative embodiment.

The operation of metadata logic 114 implementing the functionality for lockless metadata binary tree access will now be described in further detail with reference to the flow diagrams of the illustrative embodiment of FIGS. 10 and 11. The steps of FIGS. 10 and 11 are illustratively performed at least in part under the control of one or more processing devices the storage system 105. The process as shown in FIG. 10 comprises functionality for the insertion of a delta node into a binary tree and includes steps 1000 through 1024, also referred to herein as a node insertion process. In some cases, the process of FIG. 10 may be performed concurrently with any portion of the process of FIG. 11. For example, the node insertion process to insert a delta node into a particular binary tree may be performed concurrently with a read traversal process for that binary tree.

At step 1000, metadata logic 114 obtains a delta corresponding to a change in a metadata page. For example, storage controller 108 may obtain a write IO operation from a host device 102, identify a metadata page that corresponds to data being changed by the write IO operation and generate a delta for changes to the identified metadata page which is then obtained by the metadata logic 114 of the storage controller 108.

At step 1002, metadata logic 114 determines whether or not an exclusive page lock corresponding to the metadata page is available. For example, if no other write or read operations are being performed for that metadata page, the exclusive page lock would be available. If an exclusive page lock is not available, e.g., the exclusive page lock is held by another write operation or a shared page lock is held by one or more read operations, the process proceeds to step 1004. If the exclusive page lock is available, the process proceeds to step 1006.

At step 1004 metadata logic 114 waits for the exclusive page lock to become available. When the exclusive page lock becomes available the process proceeds to step 1006.

At step 1006, metadata logic 114 obtains an exclusive page lock for the metadata page.

At step 1008, metadata logic 114 identifies a binary tree that corresponds to the metadata page. For example, as mentioned above, metadata logic 114 may generate a hash of the LI found in the delta which is then used to identify the corresponding bucket of the active HBSB, e.g., generate the hash $H_3$ and identify the corresponding bucket 215-3 as shown in the example of FIG. 2.

At 1010, metadata logic 114 generates a new node comprising the delta, e.g., node 602-A of FIG. 6.

At 1012, metadata logic 114 obtains a lock on the binary tree.

At 1014, metadata logic 114 identifies a parent node of the binary tree for an insertion of the new node. For example, metadata logic 114 may traverse the binary tree based at least in part on the metadata page LI to identify the parent node. In the example of FIGS. 6-10, delta node 602-1 is identified by the metadata logic 114 as the parent node.

At 1016, metadata logic 114 determines whether or not there is a child node at the insertion location. For example, if the parent node has a child node off of the indicator 606 or 608 to which the new node will be bound, metadata logic 114 may determine that there is a child node at the insertion location. If there is a child node, the process proceeds to step 1018. If there is no child node, e.g., the indicator of the parent node to which the new node will be bound does not point to a child node the process proceeds to step 1020.

At step 1018, metadata logic 114 modifies an indicator of the new node to identify the child node. For example, with reference to FIG. 8, the left indicator 606-A of the new delta node 602-A is modified to identify the child node 602-3. The process then proceeds to step 1020.

At step 1020, metadata logic 114 inserts the new node into the binary tree as a child of the parent node. For example, as seen in FIG. 9, new delta node 602-A is inserted into the binary tree 600 by modifying the right indicator 608-1 of the delta node 602-1 to point to the new delta node 602-A.

At step 1022, metadata logic 114 releases the lock on the binary tree.

At step 1024, metadata logic 114 releases the exclusive page lock corresponding to the first metadata page.

The process as shown in FIG. 11 comprises functionality for the read traversal of a binary tree and includes steps 1100 through 1116, also referred to herein as a read traversal process. In some cases, the process of FIG. 11 may be performed concurrently with any portion of the process of FIG. 10. For example, the read traversal process to read deltas from a particular binary tree may be performed concurrently with a node insertion process to insert a delta node into that binary tree.

At step 1100, metadata logic 114 obtains an IO operation that corresponds to a metadata page, for example, from a host device 102. For example, the storage controller 108 may obtain a read IO operation from the host device 102 and determine that the metadata page corresponds to the data targeted by the read IO operation.

At step 1102, metadata logic 114 determines whether or not a shared page lock corresponding to the metadata page is available. For example, if no write operations are being performed for that metadata page LI, the shared page lock would be available. If a shared page lock is not available, e.g., an exclusive page lock is held by a write operation, the process proceeds to step 1104. If the shared page lock is available, e.g., no write operation holds the exclusive page lock, the process proceeds to step 1106. Note that other read traverse operation may also obtain the shared page lock without inhibiting metadata logic 114 from obtaining the shared page lock.

At step 1104 metadata logic 114 waits for the shared page lock to become available. When the shared page lock becomes available the process proceeds to step 1106.

At step 1106, metadata logic 114 obtains the shared page lock for the metadata page LI.

At step 1108, metadata logic 114 identifies the binary tree that contains entries which corresponds to the metadata page. For example, metadata logic 114 may determine the LI and EI for the metadata page and use the LI or both the LI and the EI to search the filters corresponding to the HBSBs and tablets to determine whether or not there are any deltas corresponding to the metadata page, as described above. As part of the search, metadata logic 114 identifies the binary tree as having one or more deltas corresponding to the metadata page.

At step 1110, metadata logic 114 traverses the binary tree based at least in part on the metadata page. For example, metadata logic 114 may traverse the binary tree based at least in part on an LI of the metadata page.

At step 1112, metadata logic 114 locates a node that corresponds to the metadata page. For example, as the metadata logic 114 traverses the binary tree, any node corresponding to the LI of the metadata page and comprising deltas for the metadata page may be located and identified. With reference to FIG. 6, for example, the delta node 602-2 may be located by the metadata logic 114.

At step 1114, metadata logic 114 obtains a delta from the located node, for example, from the payload 604-2.

At step 1116, metadata logic 114 releases the shared page lock corresponding to the first metadata page.

In this manner, the read traverse process of FIG. 11 may be performed even while the binary tree is locked by the node insertion process of FIG. 1 for the insertion of deltas associated with another metadata page since the binary tree lock is not utilized or checked for read operations. Consistency in the traverse is preserved due to the atomic nature of the node insertion, e.g., by changing the indicator of the parent node to point to the new node atomically, and also through the use of the upper level page lock which inhibits read traversal processes in the binary tree while a delta node is being inserted that comprises deltas corresponding to the same metadata page LI. Bucket contentions are reduced and storage system efficiency is increased since read traversal operations that are not associated with metadata page LIs for which node insertion operations are being performed can still traverse the bucket binary tree even when the bucket is locked by those node insertion operations.

It is to be understood that for any methodologies described herein, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 108 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 or the storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises a content addressable storage system suitably modified to incorporate the lockless metadata binary tree access functionality as disclosed herein.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with lockless metadata binary tree access functionality will now be described in greater detail with reference to FIGS. 12 and 13. Although described in the context of system 100, these platforms may also be used to implement at least portions of other information processing systems in other embodiments.

Figure 12:
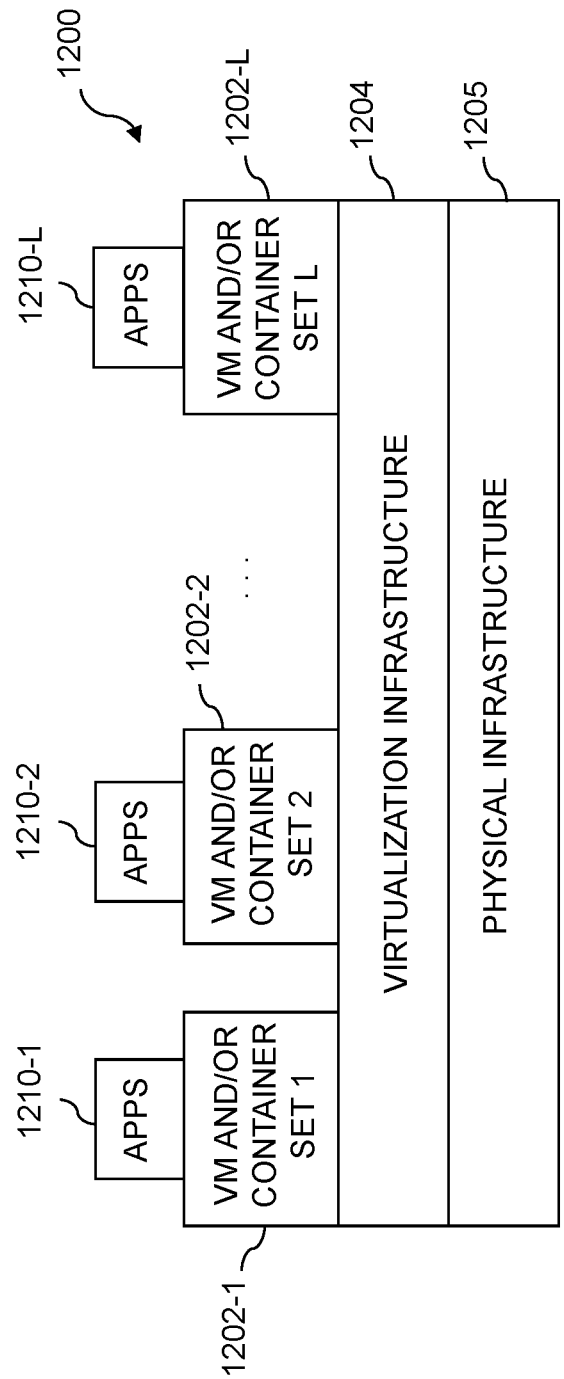
FIGS. 12 and 13 show examples of processing platforms that may be utilized to implement at least a portion of an information processing system in illustrative embodiments.
Figure 13:
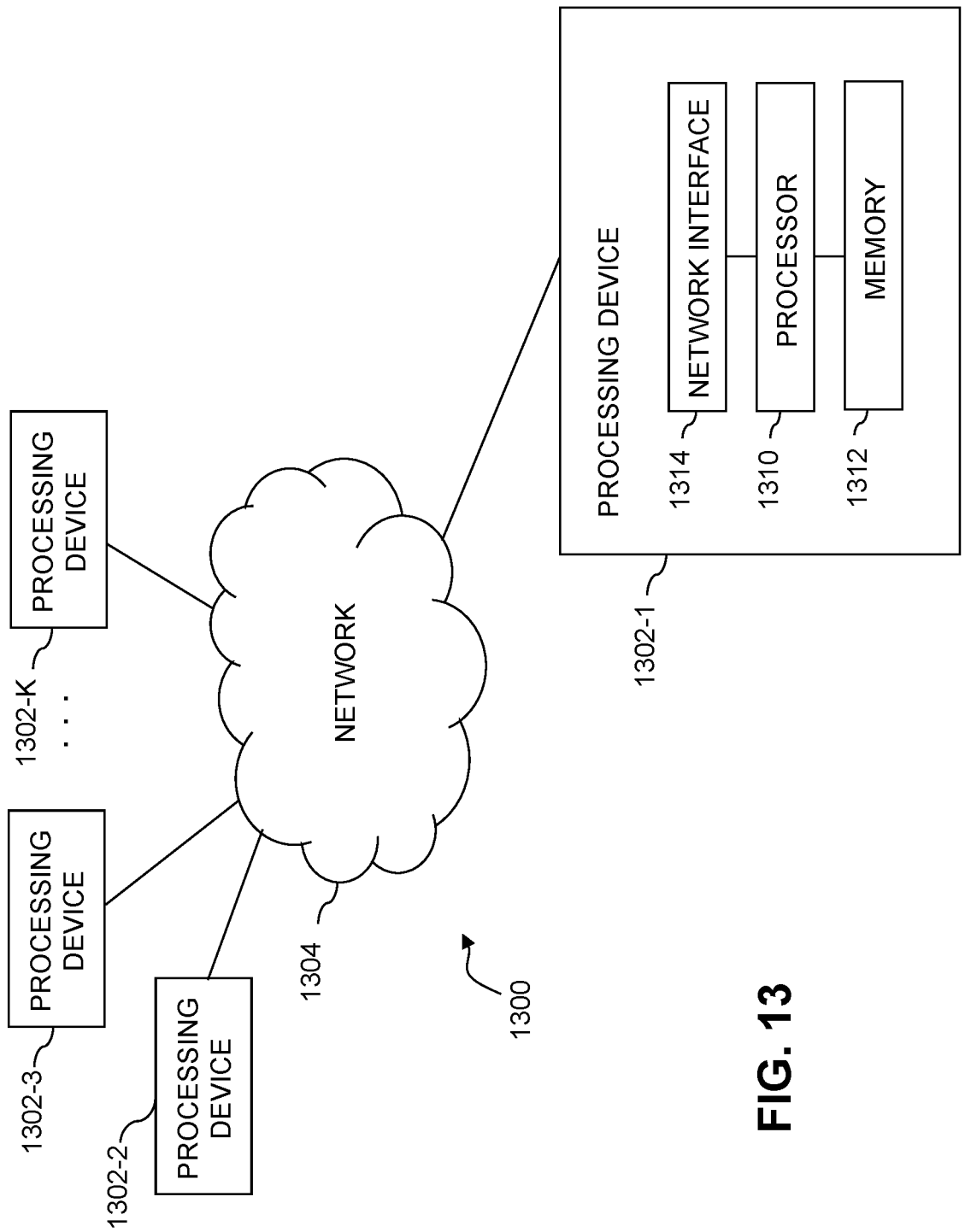

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide lockless metadata binary tree access functionality of the type described above for one or more processes running on a given one of the VMs. For example, each of the VMs can implement lockless metadata binary tree access functionality in the system 100.

An example of a hypervisor platform that may be used to implement a hypervisor within the virtualization infrastructure 1204 is the VMware® vSphere® which may have an associated virtual infrastructure management system such as the VMware® vCenter™. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can also provide lockless metadata binary tree access functionality of the type described above. For example, a container host device supporting multiple containers of one or more container sets can implement one or more cores executing the lockless metadata binary tree access functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the lockless metadata binary tree access functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, system managers, and metadata logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor coupled to memory, the at least one processing device being configured:
   to obtain an input-output operation that corresponds to a first metadata page;
   to identify a binary tree that corresponds to the first metadata page, the binary tree comprising a plurality of nodes each comprising a delta corresponding to a metadata page; and
   to perform a read traversal process corresponding to the first metadata page, the read traversal process comprising:
     traversing the binary tree based at least in part on the first metadata page while the binary tree is locked by a node insertion process corresponding to a second metadata page, the node insertion process comprising inserting a first node corresponding to the second metadata page into the binary tree;
     locating a second node of the binary tree that corresponds to the first metadata page; and
     obtaining a first delta that corresponds to the first metadata page from the second node.

2. The apparatus of claim 1 wherein the at least one processing device is further configured:
   to obtain a second delta corresponding to a change in the second metadata page;
   to determine that the binary tree corresponds to the second metadata page; and
   to perform the node insertion process corresponding to the second metadata page, the node insertion process comprising:
     generating the first node based at least in part on the second delta;
     obtaining the lock on the binary tree, the lock inhibiting at least a third node from being inserted into the binary tree;
     identifying a parent node for an insertion of the first node into the binary tree based at least in part on the second metadata page; and
     inserting the first node into the binary tree as a child of the parent node.

3. The apparatus of claim 2 wherein:
   the binary tree comprises a child node;
   the parent node comprises a first indicator that identifies the child node as a child of the parent node; and
   inserting the first node into the binary tree as a child of the parent node comprises modifying the first indicator to identify the first node instead of the child node as a child of the parent node.

4. The apparatus of claim 3 wherein:
   the first node comprises a second indicator; and
   prior to insertion of the first node into the binary tree, the second indicator is modified to identify the child node as a child of the first node.

5. The apparatus of claim 2 wherein identifying the parent node based at least in part on the second metadata page comprises identifying the parent node based at least in part on a logical index corresponding to the second metadata page.

6. The apparatus of claim 2 wherein:
   determining that the binary tree corresponds to the second metadata page comprises generating a hash of a logical index corresponding to the second metadata page; and
   the binary tree corresponds to the generated hash.

7. The apparatus of claim 1 wherein the at least one processing device is further configured:

to obtain a second input-output operation that corresponds to the second metadata page, wherein servicing the second input-output operation by the at least one processing device requires a read traversal of the binary tree;
to determine that a page lock has been taken for the second metadata page in conjunction with the node insertion process, the page lock being configured to inhibit read or write operations associated with the second metadata page; and
to inhibit the read traversal of the binary tree for the second input-output operation based at least in part on the page lock.

8. A method comprising:
obtaining an input-output operation that corresponds to a first metadata page;
identifying a binary tree that corresponds to the first metadata page, the binary tree comprising a plurality of nodes each comprising a delta corresponding to a metadata page; and
performing a read traversal process corresponding to the first metadata page, the read traversal process comprising:
  traversing the binary tree based at least in part on the first metadata page while the binary tree is locked by a node insertion process corresponding to a second metadata page, the node insertion process comprising inserting a first node corresponding to the second metadata page into the binary tree;
  locating a second node of the binary tree that corresponds to the first metadata page; and
  obtaining a first delta that corresponds to the first metadata page from the second node;
wherein the method is implemented by at least one processing device of a storage system, the at least one processing device comprising a processor coupled to memory.

9. The method of claim 8 further comprising:
obtaining a second delta corresponding to a change in the second metadata page;
determining that the binary tree corresponds to the second metadata page; and
performing the node insertion process, the node insertion process comprising:
  generating the first node based at least in part on the second delta;
  obtaining the lock on the binary tree, the lock inhibiting at least a third node from being inserted into the binary tree;
  identifying a parent node for an insertion of the first node into the binary tree based at least in part on the second metadata page; and
  inserting the first node into the binary tree as a child of the parent node.

10. The method of claim 9 wherein:
the binary tree comprises a child node;
the parent node comprises a first indicator that identifies the child node as a child of the parent node; and
inserting the first node into the binary tree as a child of the parent node comprises modifying the first indicator to identify the first node instead of the child node as a child of the parent node.

11. The method of claim 10 wherein:
the first node comprises a second indicator; and
prior to insertion of the first node into the binary tree, the second indicator is modified to identify the child node as a child of the first node.

12. The method of claim 9 wherein identifying the parent node based at least in part on the second metadata page comprises identifying the parent node based at least in part on a logical index corresponding to the second metadata page.

13. The method of claim 9 wherein:
determining that the binary tree corresponds to the second metadata page comprises generating a hash of a logical index corresponding to the second metadata page; and
the binary tree corresponds to the generated hash.

14. The method of claim 8 further comprising:
obtaining a second input-output operation that corresponds to the second metadata page, wherein servicing the second input-output operation by the at least one processing device requires a read traversal of the binary tree;
determining that a page lock has been taken for the second metadata page in conjunction with the node insertion process, the page lock being configured to inhibit read or write operations associated with the second metadata page; and
inhibiting the read traversal of the binary tree for the second input-output operation based at least in part on the page lock.

15. A computer program product comprising a non-transitory processor-readable storage medium having stored therein program code of one or more software programs, wherein the program code when executed by at least one processing device of a storage system, the at least one processing device comprising a processor coupled to a memory, causes the at least one processing device:
to obtain an input-output operation that corresponds to a first metadata page;
to identify a binary tree that corresponds to the first metadata page, the binary tree comprising a plurality of nodes each comprising a delta corresponding to a metadata page; and
to perform a read traversal process corresponding to the first metadata page, the read traversal process comprising:
  traversing the binary tree based at least in part on the first metadata page while the binary tree is locked by a node insertion process corresponding to a second metadata page, the node insertion process comprising inserting a first node corresponding to the second metadata page into the binary tree;
  locating a second node of the binary tree that corresponds to the first metadata page; and
  obtaining a first delta that corresponds to the first metadata page from the second node.

16. The computer program product of claim 15 wherein the program code further causes the at least one processing device:
to obtain a second delta corresponding to a change in the second metadata page;
to determine that the binary tree corresponds to the second metadata page; and
to perform the node insertion process, the node insertion process comprising:
  generating the first node based at least in part on the second delta;
  obtaining the lock on the binary tree, the lock inhibiting at least a third node from being inserted into the binary tree;
  identifying a parent node for an insertion of the first node into the binary tree based at least in part on the second metadata page; and inserting the first node into the binary tree as a child of the parent node.

17. The computer program product of claim 16 wherein:

the binary tree comprises a child node;

the parent node comprises a first indicator that identifies the child node as a child of the parent node;

the first node comprises a second indicator;

prior to insertion of the first node into the binary tree, the second indicator is modified to identify the child node as a child of the first node; and inserting the first node into the binary tree as a child of the parent node comprises modifying the first indicator to identify the first node instead of the child node as a child of the parent node.

18. The computer program product of claim 16 wherein identifying the parent node based at least in part on the second metadata page comprises identifying the parent node based at least in part on a logical index corresponding to the second metadata page.

19. The computer program product of claim 16 wherein:

determining that the binary tree corresponds to the second metadata page comprises generating a hash of a logical index corresponding to the second metadata page; and the binary tree corresponds to the generated hash.

20. The computer program product of claim 15 wherein the program code further causes the at least one processing device:

to obtain a second input-output operation that corresponds to the second metadata page, wherein servicing the second input-output operation by the at least one processing device requires a read traversal of the binary tree;

to determine that a page lock has been taken for the second metadata page in conjunction with the node insertion process, the page lock being configured to inhibit read or write operations associated with the second metadata page; and to inhibit the read traversal of the binary tree for the second input-output operation based at least in part on the page lock.

\* \* \* \* \*